United States Patent
Lopez et al.

(10) Patent No.: US 9,172,443 B2
(45) Date of Patent: Oct. 27, 2015

(54) LAYER SWAPPING IN EGPRS MIMO

(71) Applicant: Telefonaktiebolaget L M Ericsson (publ), Stockholm (SE)

(72) Inventors: Miguel Lopez, Solna (SE); Henrik Sahlin, Mölnlycke (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 14/001,684

(22) PCT Filed: Jul. 25, 2013

(86) PCT No.: PCT/SE2013/050930
§ 371 (c)(1),
(2) Date: Jan. 15, 2014

(87) PCT Pub. No.: WO2014/031060
PCT Pub. Date: Feb. 27, 2014

(65) Prior Publication Data
US 2014/0119472 A1    May 1, 2014

Related U.S. Application Data

(60) Provisional application No. 61/684,865, filed on Aug. 20, 2012.

(51) Int. Cl.
H04B 7/02    (2006.01)
H04B 7/04    (2006.01)
H04L 1/00    (2006.01)

(52) U.S. Cl.
CPC ............ *H04B 7/0413* (2013.01); *H04L 1/0025* (2013.01); *H04L 1/0071* (2013.01)

(58) Field of Classification Search
CPC .............. H04B 1/00; H04B 3/00; H04B 7/00; H04B 14/00; H04B 17/00; H04B 2001/00; H04B 2201/00; H04B 2203/00; H04B 2215/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00
See application file for complete search history.

(56) References Cited

U.S. PATENT DOCUMENTS

2006/0205357 A1* 9/2006 Kim ................................ 455/69
2011/0142001 A1   6/2011 Ko et al.
2013/0128942 A1* 5/2013 Sikri et al. .................... 375/229

OTHER PUBLICATIONS

International Search Report and Written Opinion for PCT/SE2013/050930, mailed Nov. 5, 2013, 11 pages.

(Continued)

*Primary Examiner* — Adolf Dsouza
(74) *Attorney, Agent, or Firm* — Patent Portfolio Builders, PLLC

(57) ABSTRACT

A network node for an EGPRS system, equipped with a plurality of transmit antennas and arranged to transmit at least a first and a second data stream as MIMO streams, with the first data stream being transmitted from a first antenna and the second data stream being transmitted from a second transmit antenna. The network node is arranged to transmit the data streams as bursts comprising a training sequence and payload. The network node is arranged to swap parts of the data streams between the transmit antennas, i.e. to transmit all or parts of one or more bursts belonging to the first data stream from the second transmit antenna and to transmit corresponding all or parts of one or more bursts belonging to the second data stream from the first transmit antenna.

22 Claims, 13 Drawing Sheets

(56) References Cited

OTHER PUBLICATIONS

Author Unknown, "3GPP TS 45.001: Physical Layer on the Radio Path; General Description (Release 10)," 3rd Generation Partnership Project (3GPP):Technical Sepcifications Group GSM/EDGE Radio Access Network, Nov. 2011, vol. 10.1.0, 44 pages.

Author Unknown, "3GPP TS 45.002: Multiplexing and Multiple Access on the Radio Path (Release 10)," 3rd Generation Partnership Project (3GPP):Technical Sepcifications Group GSM/EDGE Radio Access Network, Mar. 2012, vol. 10.3.0, 112 pages.

Author Unknown, "3GPP TS 45.003: Radio Access Netowrk; Channel Coding (Release 10)," 3rd Generation Partnership Project (3GPP):Technical Sepcifications Group GSM/EDGE Radio Access Network, Mar. 2012, vol. 10.0.0, 320 pages.

Author Unknown, "MIMO Concepts for EGPRS," 3GPP TSG Geran #54, Agenda Items 6.1, 7.1.5.4, Nokia Siemens Networks, May 14-18, 2012, 7 pages, Sanya, P.R. China.

* cited by examiner

| MCS used in Data stream 1 | MCS used in Data stream 2 | Granularity level, swapping (Ref: Figs 5 & 6) |
|---|---|---|
| MCS-1 to MCS-4 | MCS-1 to MCS-9 | 1 |
| MCS-5 to MCS-6 | MCS-5 to MCS-6 | 3 |
| MCS-5 to MCS-6 | MCS-7 to MCS-9 | 2 |
| MCS-7 to MCS-9 | MCS-7 to MCS-9 | 2 |

Fig 7

LAYER SWAPPING IN EGPRS MIMO

This application is a 35 U.S.C. §371 national phase filing of International Application No. PCT/SE2013/050930, filed Jul. 25, 2013, the disclosure of which is incorporated herein by reference in its entirety.

TECHNICAL FIELD

The present invention discloses swapping of layers in EGPRS MIMO.

BACKGROUND

The technology known as MIMO, Multiple Input, Multiple Input, is advantageous in wireless communications systems since MIMO offers the possibility of increased spectrum efficiency and increased peak rates as compared to non-MIMO technologies.

Implementations of MIMO in EGPRS/EGPRS2 will have to take into account the structure of the EGPRS/EGPRS2 packet data channels, which use burst transmissions, and where one radio block comprises four bursts. In so called BTTI mode (Basic Transmission Time Interval), the bursts are transmitted in four consecutive TDMS frames, i.e. over a total of 20 ms, while in so called RTTI mode (Reduced TTI), the four bursts are transmitted in two consecutive TDMA frames, i.e. over a total of 10 ms. A burst in EGPRS/EGPRS2 comprises a training sequence, as well as payload. The payload comprises a header, as well as the so called q-bits, which partially signal to the receiver which so called MCS, Modulation and Coding Scheme that has been used.

The use of the word "partially" is used here with reference to the information given by the q-bits regarding which MCS that has been used can be exemplified by the following: If, for example, in an EGPRS system, the q-bits are 0 0 0 0 0 0 0 0, this sequence of q-bits signals to the receiver that either MCS5 or MCS6 has been used. This means that even with the aid of the q-bits, the receiver still needs to determine the exact MCS that has been used, although the q-bits have aided in narrowing the number of alternatives. As mentioned, the payload comprises a header, and there are different types of headers. In our example, by knowing that either MSC5 or MCS6 is used, the receiver knows the header type (which is common to MCS5 and MCS6), so the receiver can now decode the header and determine the exact MCS.

The use of MIMO has been proposed in EGPRS and EGPRS2. In a straightforward implementation of MIMO in EGRS and EGPRS2, each of two (or more) data streams, also sometimes referred to as "layers", is transmitted from its own antenna. In such an implementation, although advantageous in many aspects, the signal strengths of the data streams will vary over time, and the rates of (successful) detection will vary accordingly.

In conclusion, MIMO implementations of EGPRS/EGPRS2 need to be designed to maximize the link performance, while maintaining, as much as possible, backwards compatibility with the GSM interface.

SUMMARY

It is an object of the invention to address the issues of MIMO in EGPRS/EGPRS 2 mentioned above.

This object is obtained by means of a network node for an EGPRS system. The network node is equipped with a plurality of transmit antennas and is arranged to transmit at least a first and a second data stream as MIMO streams, with the first data stream being transmitted from a first transmit antenna and the second data stream being transmitted from a second transmit antenna.

The network node is arranged to transmit the data streams as bursts comprising a training sequence and payload, and the network node is arranged to swap parts of the data streams between the transmit antennas, i.e. to transmit all or parts of one or more bursts belonging to the first data stream from the second transmit antenna and to transmit corresponding all or parts of one or more bursts belonging to the second data stream from the first transmit antenna.

By means of the swapping, diversity gains are obtained as compared to prior art EGPRS/EGPRS2 MIMO.

In embodiments, the network node is arranged to swap all or parts of the payload of two or more bursts from said data streams between the bursts.

In embodiments, the network node is arranged to swap all or parts of the q-bits of two or more bursts from said data streams between the bursts, the q-bits being bits that partially identify the Modulation and Coding Scheme, MCS, that has been used in a radio block which comprises a number of bursts.

In embodiments, the network node is arranged to swap all or parts of the training sequences of two or more bursts from the data streams between the bursts.

In embodiments, the network node is arranged to perform the swaps adaptively in response to the modulation and coding scheme, MCS, used for the bit streams.

In embodiments, the network node is arranged to perform the swaps adaptively in response to the length of the transmission time intervals, TTIs, used, said TTIs being either Basic TTIs or Reduced TTIs.

The object is also obtained by means of a network node for an EGPRS system which is equipped with a plurality of receive antennas and which is arranged to receive at least a first and a second data stream as MIMO streams from a transmitting node, with the first data stream having been transmitted from a first transmit antenna and the second data stream having been transmitted from a second transmit antenna.

The network node is arranged to receive the data streams as bursts comprising a training sequence and payload, and is arranged to detect if parts of the data streams have been swapped between the transmit antennas, i.e. if all or parts of one or more bursts belonging to the first data stream have been transmitted from the second transmit antenna and corresponding all or parts of one or more bursts belonging to the second data stream have been transmitted from the first transmit antenna, and if such swaps have taken place, to restore swapped parts of the data streams to their proper data stream, and to then demodulate and decode the data streams regardless of whether or not swaps have taken place between the data streams.

By means of the network node, the diversity gains made in transmission by means of the swapping can be capitalized upon.

In embodiments, the network node is arranged to receive an indication that parts of said data streams have been swapped between the transmit antennas. In embodiments, the network node is arranged to receive the indication as one or more of:

- An information element, SI, in a system information message on a broadcast channel,
- An information element, SI, in a dedicated signaling message,
- As information in the header of RLC data blocks conveyed by the bursts, By means of symbol rotation in the bursts, By means of special training sequences used for swapped data streams.

In embodiments, the network node is arranged to detect swaps of the payload of two or more bursts between said data streams.

In embodiments, the network node is arranged to detect swaps of the q-bits of two or more bursts between said data streams, the q-bits being bits that partially identify the Modulation and Coding Scheme, MCS, that has been used in a radio block which comprises a number of bursts.

In embodiments, the network node is arranged to detect swaps of the training sequences of two or more bursts between the data streams.

The objective is also obtained by means of a method for operating a network node in an EGPRS system, where the method comprises transmitting at least a first and a second data stream as MIMO streams. The first data stream is transmitted from a first transmit antenna and the second data stream is transmitted from a second transmit antenna. The method further comprises transmitting the data streams as bursts comprising a training sequence and payload. The method comprises swapping parts of the data streams between the transmit antennas, i.e. transmitting all or parts of one or more bursts belonging to the first data stream from the second transmit antenna and transmitting corresponding all or parts of one or more bursts belonging to the second data stream from the first transmit antenna.

In embodiments, the method comprises swapping all or parts of the payload of two or more bursts from said data streams between the bursts.

In embodiments, the method comprises swapping all or parts of the q-bits of two or more bursts from said data streams between the bursts, the q-bits being bits that partially identify the Modulation and Coding Scheme, MCS, that has been used in a radio block which comprises a number of bursts In embodiments, the method comprises swapping all or parts of the training sequences of two or more bursts from said data streams between the bursts.

In embodiments, the method comprises performing the swaps adaptively in response to the modulation and coding scheme, MCS, used for the bit streams.

In embodiments, the method comprises performing the swaps adaptively in response to the length of the transmission time intervals, TTIs, used, said TTIs being either Basic TTIs or Reduced TTIs.

The object is also obtained by means of a method for operating a network node in an EGPRS system where the method comprises receiving at least a first and a second data stream as MIMO streams from a transmitting node, with the first data stream having been transmitted from a first transmit antenna and the second data stream having been transmitted from a second transmit antenna. The method comprises receiving the data streams as bursts comprising a training sequence and payload, and the method comprises detecting if parts of said data streams have been swapped between the transmit antennas, i.e. if all or parts of one or more bursts belonging to the first data stream have been transmitted from the second transmit antenna and corresponding all or parts of one or more bursts belonging to the second data stream have been transmitted from the first transmit antenna, and if such swaps have taken place, the method comprises restoring swapped parts of the data streams to their proper data stream. The method also comprises demodulating and decoding the data streams regardless of whether or not swaps have taken place between the data streams.

In embodiments, the method comprises receiving an indication that parts of the data streams have been swapped between the transmit antennas. In embodiments, the method comprises receiving the indication as one or more of:

An information element, SI, in a system information message on a broadcast channel, An information element, SI, in a dedicated signaling message, As information in the header of RLC data blocks conveyed by the bursts, By means of symbol rotation in the bursts, By means of special training sequences used for swapped data streams.

In embodiments, the method comprises detecting swaps of the payload of two or more bursts between the data streams.

In embodiments, the method comprises detecting swaps of the q-bits of two or more bursts between the data streams, the q-bits being bits that partially identify the Modulation and Coding Scheme, MCS, that has been used in a radio block which comprises a number of bursts.

In embodiments, the method comprises detecting swaps of the training sequences of two or more bursts between said data streams.

BRIEF DESCRIPTION OF THE DRAWINGS

The invention will be described in more detail in the following, with reference to the appended drawings, in which FIG. 7 shows granularity levels of EGPRS MIMO swapping for different MCSs.

DETAILED DESCRIPTION

Figure 1:
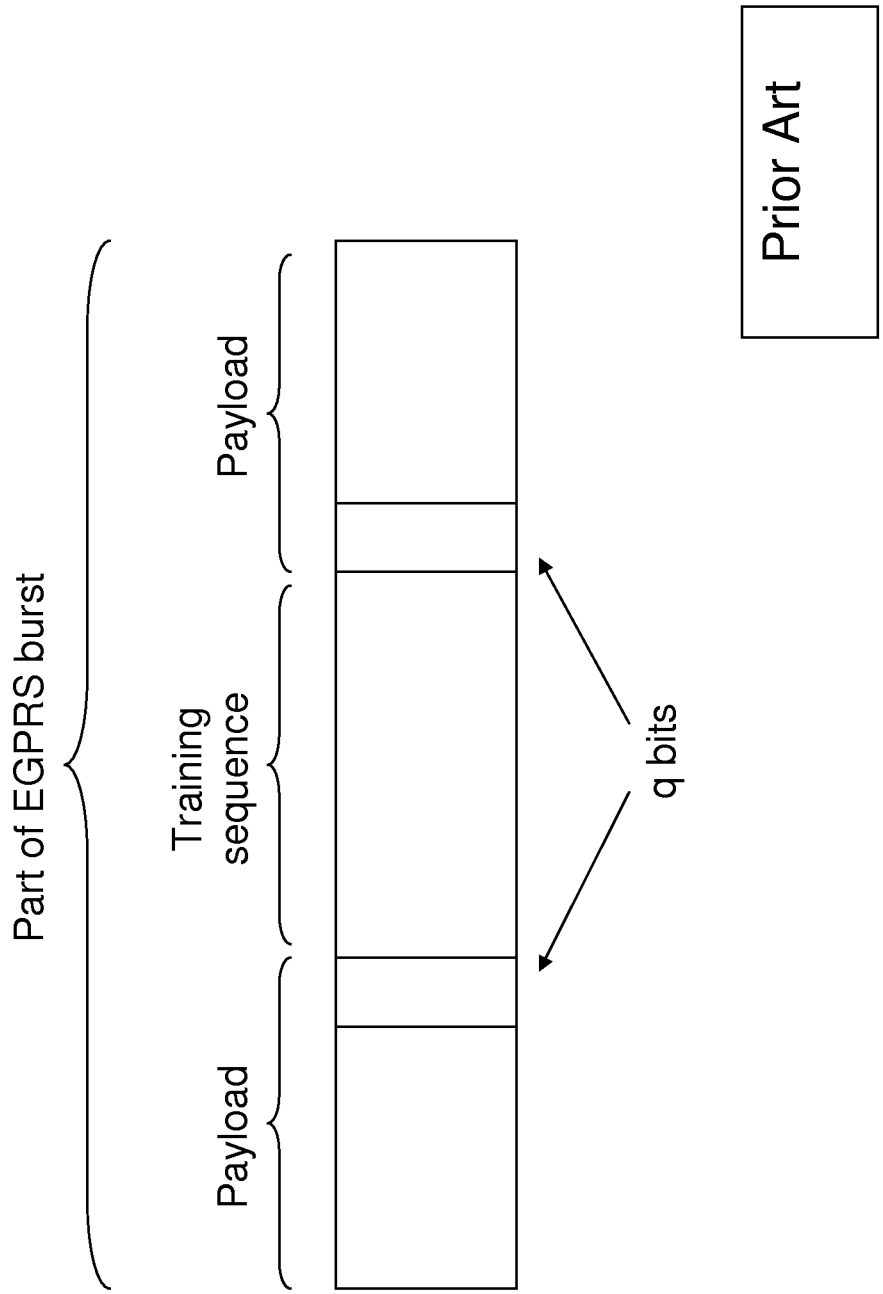
FIG. 1 shows part of a prior art EGPRS burst.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

In the following description, the term EGPRS will be used in order to denote EGPRS as well as its derivatives, such as, for example, EGPRS2.

Initially, a brief background will be given of some aspects of EGPRS.

FIG. 1 shows part of an EGPRS burst: as can be seen, a burst comprises a training sequence in the middle of the burst, and the training sequence is flanked on both sides by payload.

The payload as such comprises a header, as well as so called q-bits, which together (i.e. the header and the q-bits) describe the packet data block type.

Figure 2:
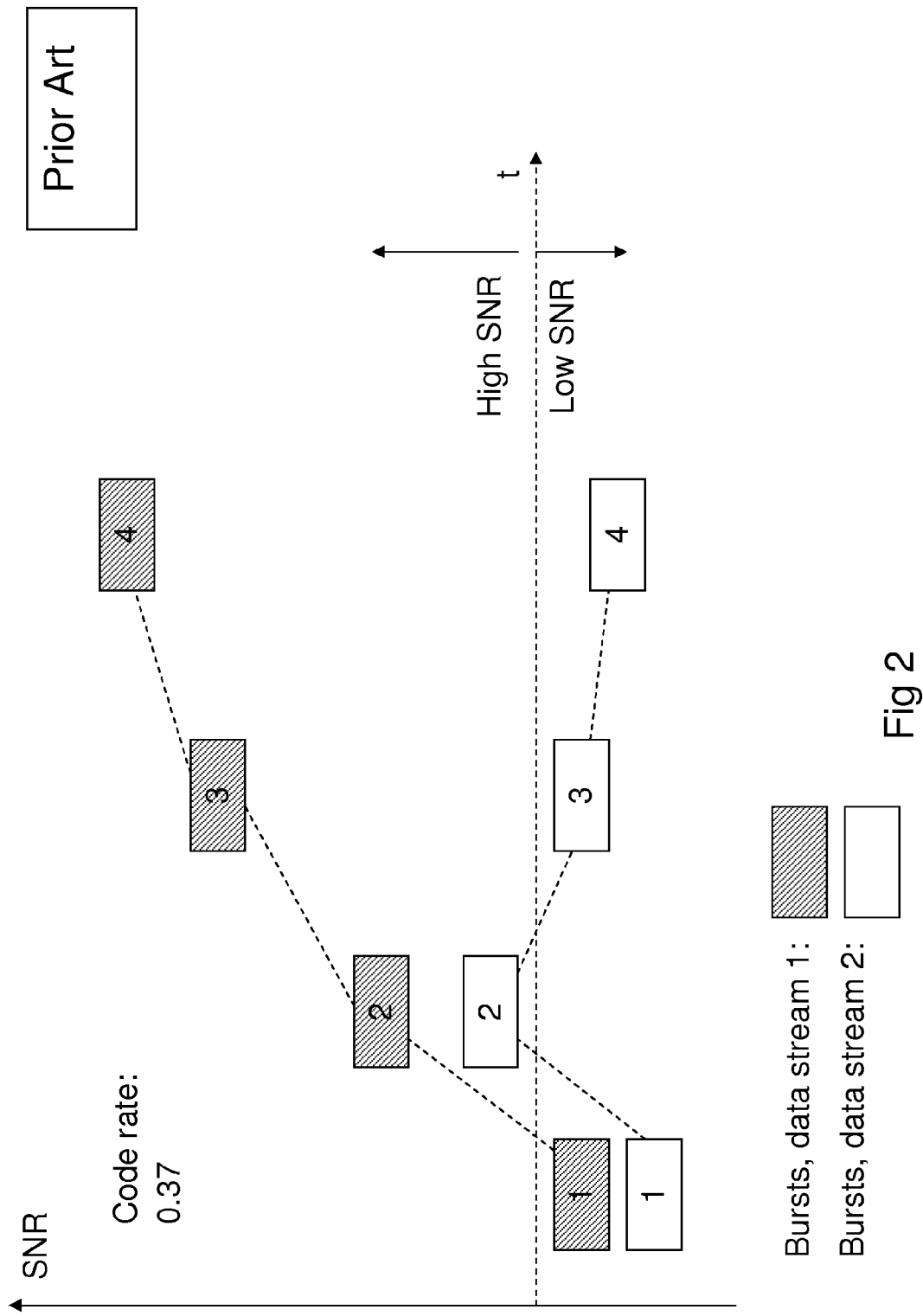
FIG. 2 shows prior art MIMO transmission of EGPRS bursts.

FIG. 2 shows an example of prior art MIMO transmission of bursts of two data streams in EGPRS, using the Modulation and Coding Scheme, MCS, called MCS-5. The MIMO transmission is made by means of transmitting two data streams in two transmit antennas, with one transmit antenna being used per data stream. In the two data streams, four bursts constitute a so called radio block, and in this example, one radio block is used to carry one so called RLC data block. In FIG. 2, the SNR, Signal to Noise Ratio, of the bursts of the two data streams is also shown, and a horizontal dashed line ("High/Low SNR") indicates the SNR threshold for successful decoding. A so called code rate of 0.37 is used. Dashed lines are used to connect the bursts within the data streams, in order to show which bursts that belong to the individual data streams.

As can be seen, three of the four bursts of the data stream referred to as data stream 1 have an advantageous SNR, which given the low code rate equal to 0.37, leads to a successful decoding of the RLC data block of data stream 1. For data stream 2, however, the SNR of the bursts is less advantageous, which leads to failed decoding of the RLC data block of data stream 2.

Figure 3:
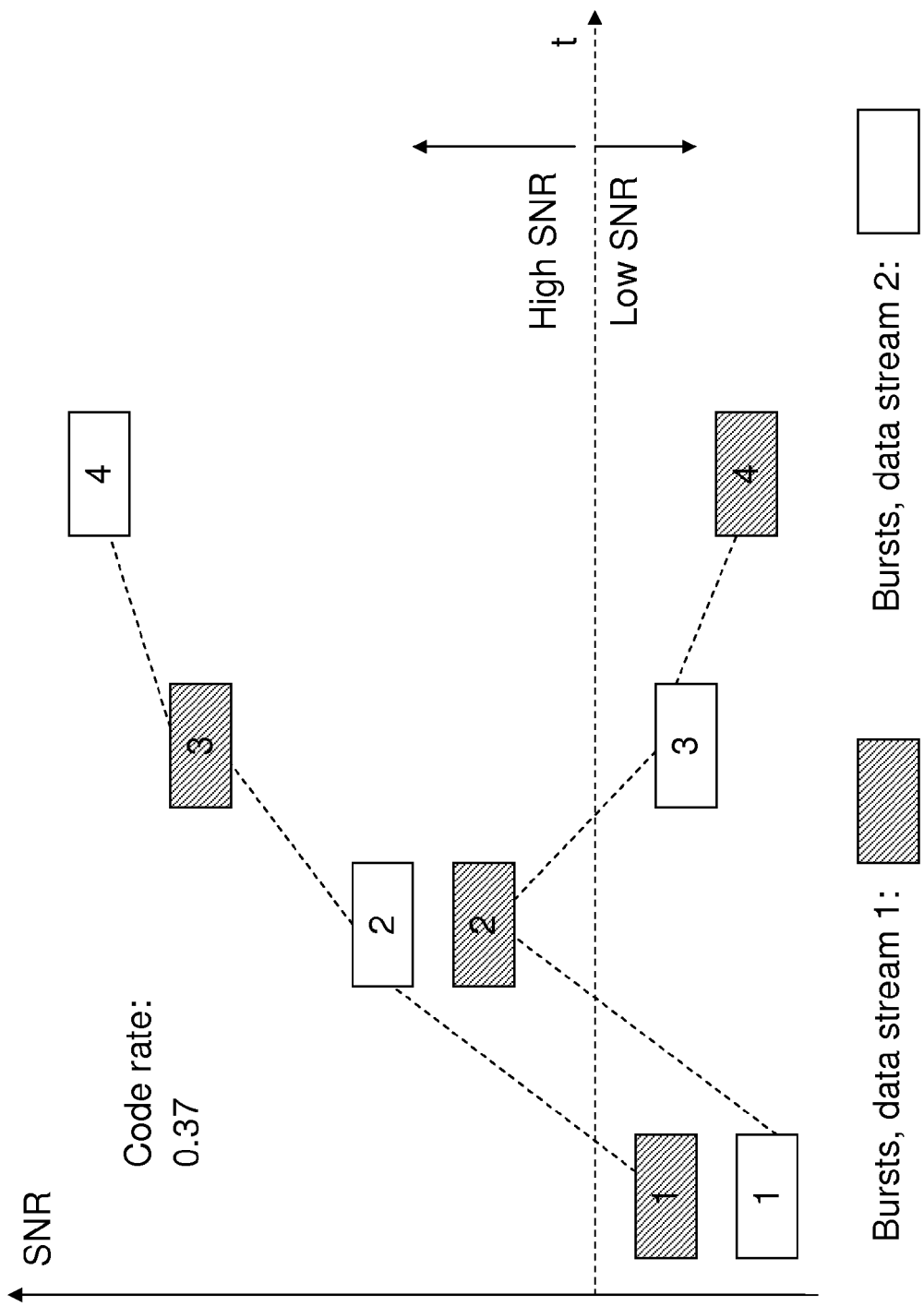
FIG. 3 shows MIMO transmission of EGPRS bursts.

FIG. 3 shows an example of MIMO transmissions of bursts of two data streams in EGPRS, using MCS 5, but this time with "swapping" of the bursts in the two data streams. As shown, the swapping in this example takes place by means of interleaving every second burst between the data streams. This is only one example of swapping, other examples will be shown later in this description.

In the example shown in FIG. 3, the RLC data blocks carried by both of the data streams are successfully decoded, since two out of four bursts per radio block have a high SNR, which given the code rate of 0.37 used in this example, is sufficient for successful decoding of the entire RLC data block.

Figure 4:
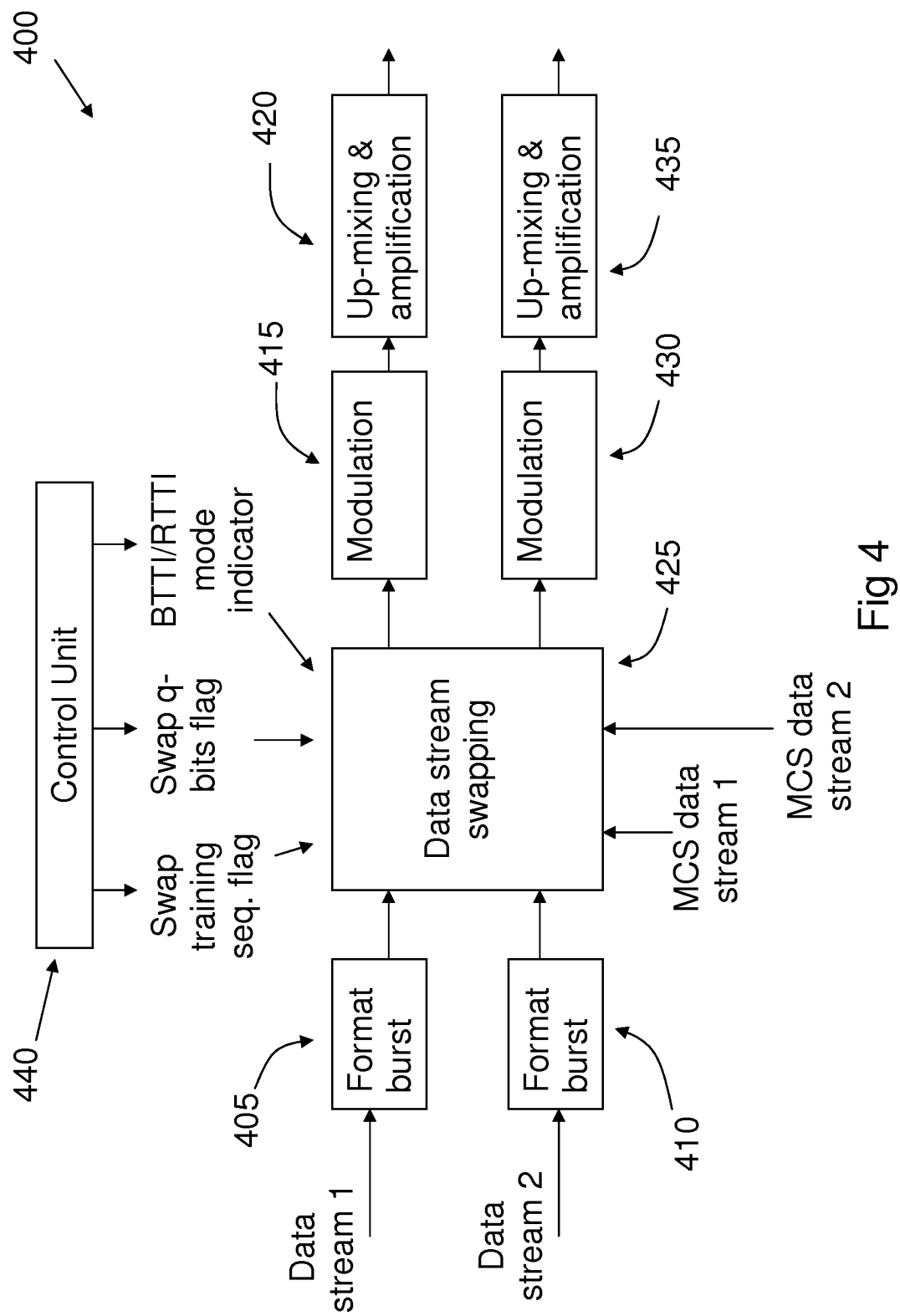
FIG. 4 shows a block diagram of an EGPRS MIMO transmitter.

Thus, as exemplified by FIG. 3, swapping of bursts between data streams in EGPRS MIMO will lead to improved decoding rates. Before other examples of swapping between data streams are shown, a transmitter for data stream swapping in EGPRS MIMO will be described with reference to FIG. 4:

FIG. 4 shows a transmitter 400 which is arranged to transmit a first and a second EGPRS data stream in MIMO mode. The term "MIMO" is here used in the sense that the data streams are transmitted simultaneously from separate antennas, i.e. one transmit antenna is used for each data stream. The data streams are denoted "Data stream 1" and "Data stream 2" in FIG. 4. Naturally, the principle shown in FIG. 4 and throughout this description can be applied to more than two data streams.

The transmitter 400 comprises one burst formatter 405, 410 per data stream, which receive the data streams and form the bursts in the proper manner. The transmitter 400 also comprises a data stream swapper 425, which, as the name implies, swaps, i.e. shifts, data between the data streams in a desired fashion. In the example shown in FIG. 3, the data stream swapper 425 would have been responsible for swapping every other burst between the data streams. However, the data swapping can be carried out in many other ways by the data stream swapper 425, as will be explained later in this text.

The data stream swapping is suitably carried out as a function of the MCS used by the two data streams, for which reason, as shown in FIG. 4, the data stream swapper 425 is arranged to receive information regarding the MCS of data stream 1 and data stream 2. In addition, the data stream swapper 425 also needs to know if the q-bits and the training sequences of the bursts in the two data streams should be swapped or not. To this end, the data stream swapper 425 is arranged to receive input regarding the swapping of the q-bits and the training sequences, for example in the form of two flags, one which indicates "training sequence swapping, Yes/No" and one which indicates "q-bit swapping, Yes/No". Another factor which is suitably used by the data stream swapper 425 is whether BTTIs or RTTIs are used, i.e. Basic or Reduced TTIs. For this reason, the data stream swapper 425 is also arranged to receive information shown in FIG. 4 as "BTTI/RTTI mode indicator". The information regarding the q-bits, training sequences and BTTI or RTTI is provided to the data stream swapper 425 by a control unit 440 which controls the general and overall function of the transmitter 400.

Using the information supplied to it, the data stream swapper 425 swaps data between the two data streams, and then outputs two data streams with the swapped data. Each of the two output data streams from the data stream swapper 425 is modulated by respective modulation units 415, 430, and are then subjected to a conversion in frequency to RF frequency ("up-mixing") and amplified, and then transmitted from (not shown) transmit antennas.

Figure 5:
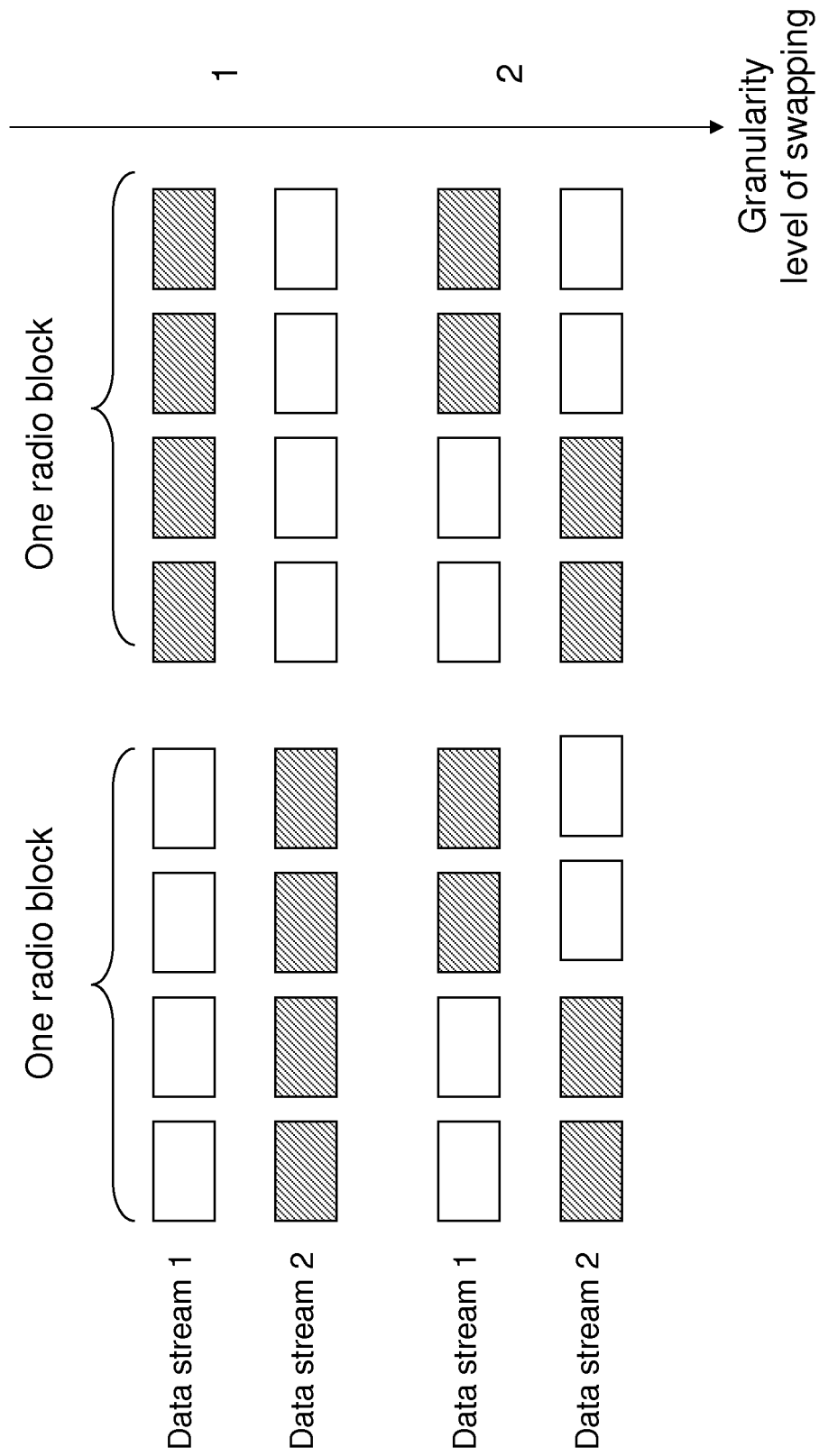
FIGS. 5 and 6 show different granularity levels of EGPRS MIMO swapping.
Figure 6:
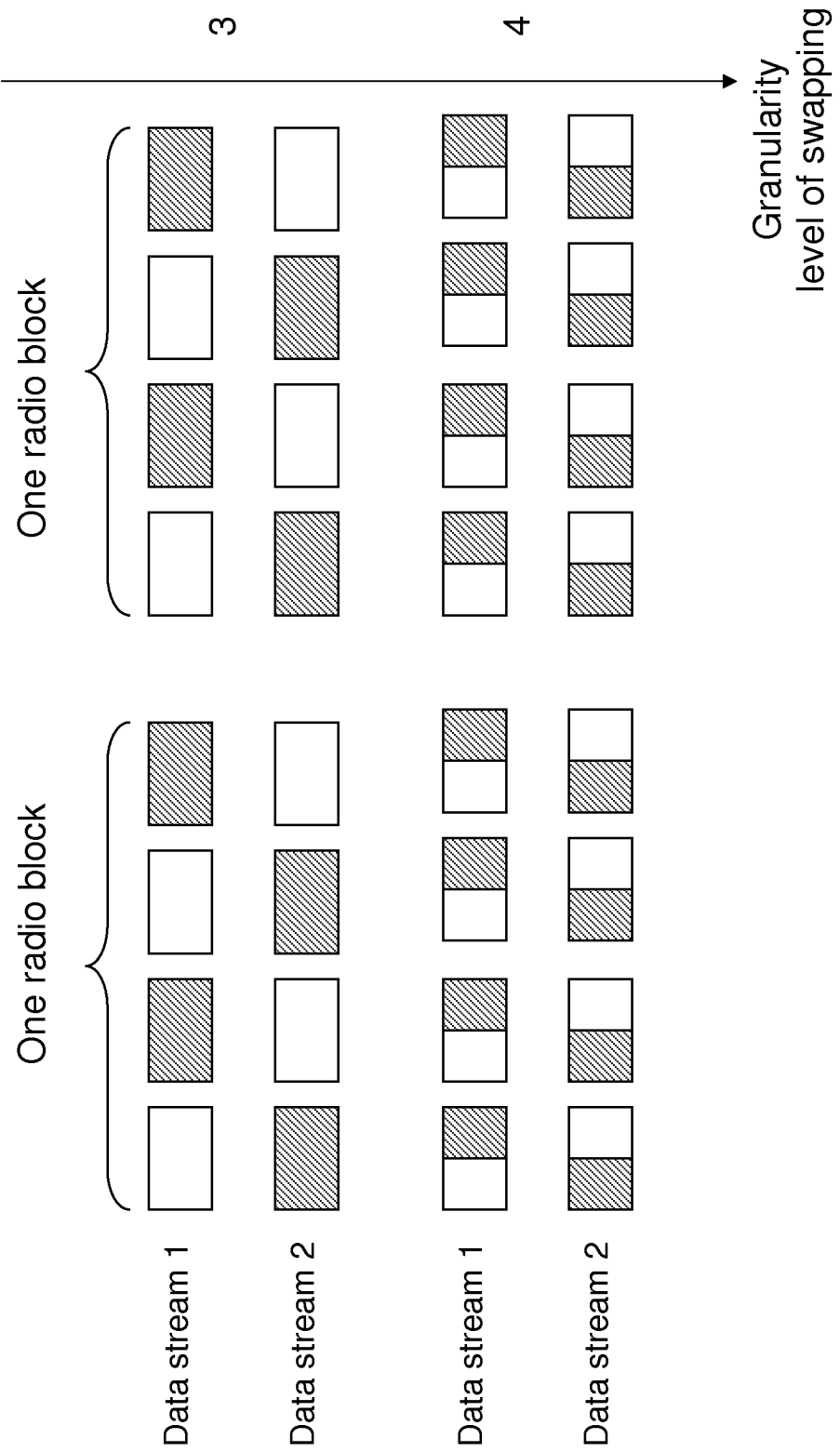

Turning now to further examples of swapping of data between data streams, the concept of granularity with regard to the swapping will now be introduced. FIGS. 5 and 6 show examples of four granularity levels: at level 1, the content of a full radio block is swapped between the data streams, so that in the swapped streams, radio blocks from data stream 1 are interleaved with radio blocks from data stream 2, i.e. every other radio block is swapped between the data streams. At level 2, half of a radio block is swapped between the data streams, i.e. two consecutive bursts are swapped. At level three, individual bursts are swapped, so that every other burst is swapped between the data streams. At level four, halves of individual bursts are swapped, so that every other half burst is swapped between the data streams. In principle, the swapping can take place down to bit level, i.e. individual bits could be swapped between the data streams.

In addition, the decision on whether or not the q-bits and/or the training sequences are to be swapped can be taken independently of the granularity of the swapping.

Two examples of "swapping patterns" obtained by means of the data stream swapper 425 are:

Example 1

Granularity level 2
Payload swapped
Training sequence swapped
q bits swapped

Example 2

Granularity level 3
Payload swapped
Training sequence not swapped
q bits not swapped The choice of granularity for the swapping, i.e. the level of swapping between the data streams, is suitably chosen depending on the MCS of each data stream involved in the swapping. FIG. 7 shows a table of suitable swapping granularity for EGPRS MIMO depending on the MCS when there are two data streams involved. Similar tables can be designed for other versions of EGPRS, e.g. EGPRS2. It can be pointed out that the choice of MCS might be beneficially influenced by the TTI mode used, i.e. BBTTI or RTTI. For example in FIG. 7, granularity level 3 might be replaced by granularity level 4 when RTTI is used instead of BTTI.

Figure 8:
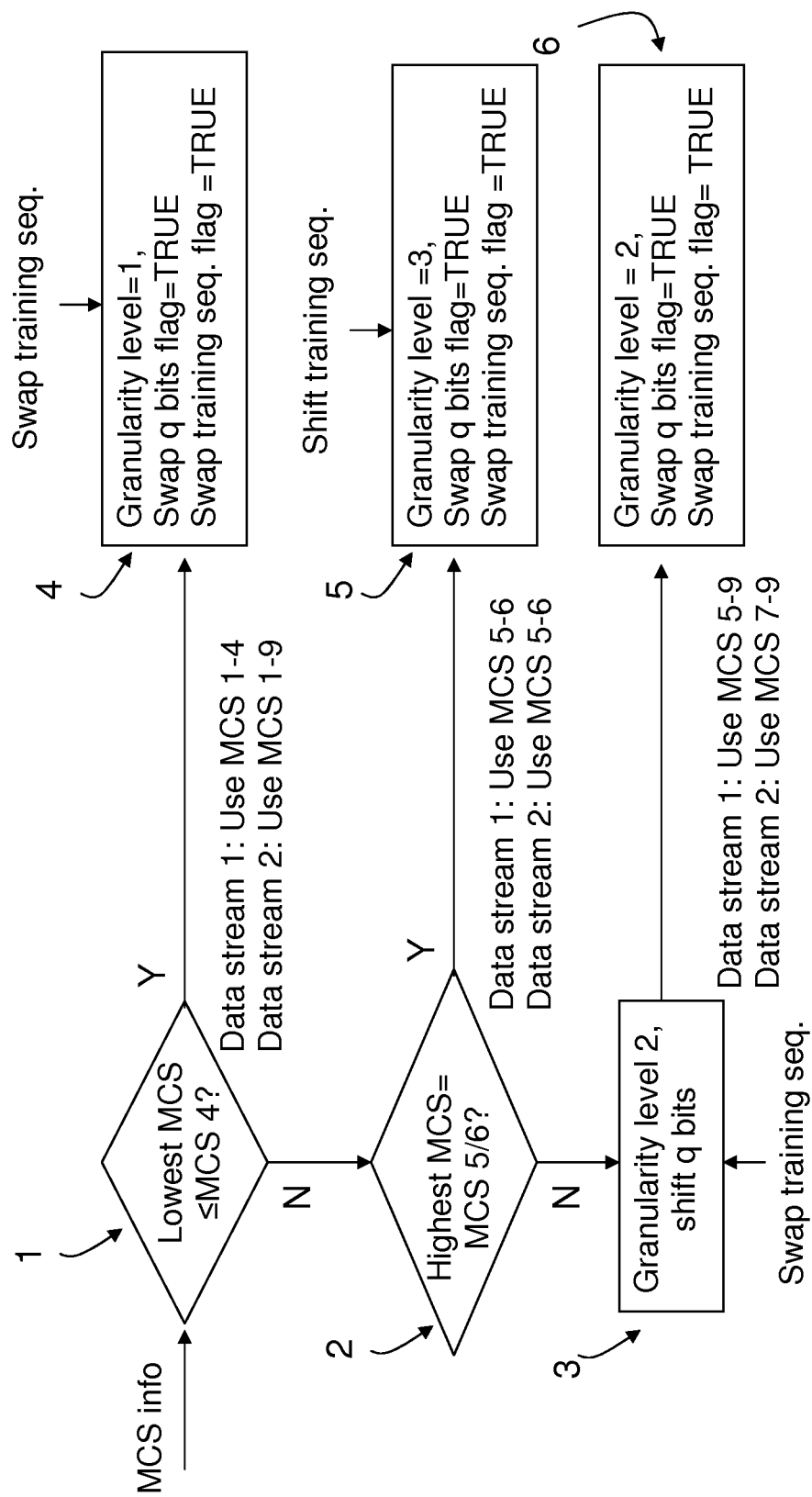
FIGS. 8 and 9 show flow charts for a data stream swapper.

FIG. 8 is a flow chart which illustrates a possible function of the data stream swapper 425 depending in the MCS of two data streams, given that it is desired to swap the training sequences of the data streams. The data stream swapper will now be referred to by the abbreviation DSS:

In step 1, the DSS receives information on the MCSs used for the two data streams, i.e. data stream 1 and 2. In step 1, the DSS investigates if the lowest MCS used for either data stream is 4 or lower. If the answer is YES, the DSS uses one of MCS 1-4 for one of the data streams, and one of MCS 1-9 for the other data stream. In FIG. 8, this is shown as data stream 1 using MCS 1-4 and data stream 2 using MCS 1-9, but the opposite might equally well be the case, i.e. data stream 2 could be assigned MCS 1-4 and data stream 1 could be assigned to MCS 1-9. In step 4, the DSS receives information that it is desired to swap, the training sequences, and therefore makes the following decision regarding the swapping:

Granularity level: 1
Swap q bits (shown in FIG. 8 as the corresponding flag being TRUE)
Swap training sequence (shown in FIG. 8 as the corresponding flag being TRUE)

If, in step 1, the lowest MCS used turns out to be higher than 4, then, in step 2, the DSS investigates if the highest MCS used for either data stream is MCS 5 or 6. If the answer is YES, the DSS uses one of MCS 5 or 6 for one of the data streams, and one of MCS 5 or 6 for the other data stream. In FIG. 8, this is shown as data stream 1 using MCS 5-6 and data stream 2 using MCS 5-6. In step 5, the DSS receives information that it is desired to swap the training sequences, and therefore makes the following decision regarding the swapping:

Granularity level: 3
Swap q bits (shown in FIG. 8 as the corresponding flag being TRUE)
Swap training sequence (shown in FIG. 8 as the corresponding flag being TRUE)

If, in step 2, the highest MCS used for either data stream is higher than MCS 5 or 6, then the DSS, in step 3, decides to use granularity level 2 (see FIG. 5) and to swap the q bits. The DSS also receives information that it is desired to swap the training sequence. The DSS decides to use one of MCS 5-9 for one of the data streams, and one of MCS 7-9 for the other data stream. In FIG. 8, this is shown as data stream 1 using MCS 5-9 and data stream 2 using MCS 7-9, but the opposite might equally well be the case, i.e. data stream 2 could be assigned one of MCS 5-9 and data stream 1 could be assigned one of MCS 7-9.

In step 6, the DSS then makes the following decision regarding the swapping:

Granularity level: 2
swap q bits (shown in FIG. 8 as the corresponding flag being TRUE)
swap training sequence (shown in FIG. 8 as the corresponding flag being TRUE)

Figure 9:
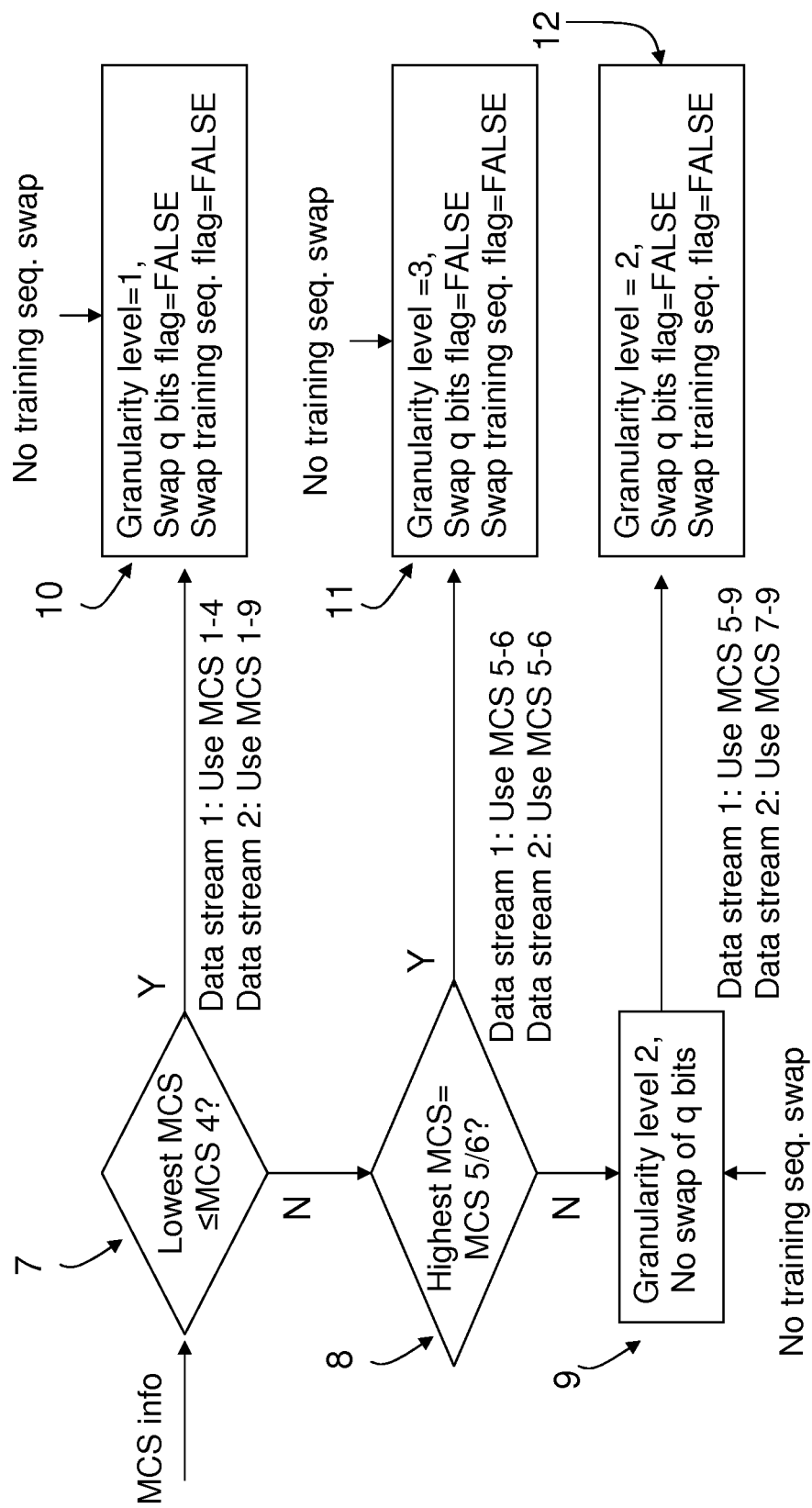

FIG. 9 is a flow chart which illustrates a possible function of the data stream swapper 425 depending in the MCS of two data streams, given that it is not desired to swap the training sequences of the data streams. The data stream swapper will now be referred to by the abbreviation DSS:

In step 7, the DSS receives information on the MCSs used for the two data streams, i.e. data stream 1 and 2. In step 7, the DSS investigates if the lowest MCS used for either data stream is 4 or lower. If the answer is YES, the DSS uses one of MCS 1-4 for one of the data streams, and one of MCS 1-9 for the other data stream. In FIG. 9, this is shown as data stream 1 using MCS 1-4 and data stream 2 using MCS 1-9, but the opposite might equally well be the case, i.e. data stream 2 could be assigned MCS 1-4 and data stream 1 could be assigned to MCS 1-9. In step 10, the DSS receives information that it is not desired to swap the training sequences, and therefore makes the following decision regarding the swapping:

Granularity level: 1
No swap of q bits (shown in FIG. 9 as the corresponding flag being FALSE)
No swap of training sequence (shown in FIG. 8 as the corresponding flag being FALSE)

If, in step 7, the lowest MCS used turns out to be higher than 4, then, in step 8, the DSS investigates if the highest MCS used for either data stream is MCS 5 or 6. If the answer is YES, the DSS uses one of MCS 5 or 6 for one of the data streams, and one of MCS 5 or 6 for the other data stream. In FIG. 9, this is shown as data stream 1 using MCS 5-6 and data stream 2 using MCS 5-6. In step 11, the DSS receives information that it is not desired to swap the training sequences, and therefore makes the following decision regarding the swapping:

Granularity level: 3
No swap of q bits (shown in FIG. 9 as the corresponding flag being FALSE)
No swap of training sequence (shown in FIG. 9 as the corresponding flag being FALSE)

If, in step 8, the highest MCS used for either data stream is higher than MCS 5 or 6, then the DSS, in step 9, decides to use granularity level 2 (see FIG. 5) and to not swap the q bits. The DSS also receives information that it is desired to swap the training sequence. The DSS decides to use one of MCS 5-9 for one of the data streams, and one of MCS 7-9 for the other data stream. In FIG. 9, this is shown as data stream 1 using MCS 5-9 and data stream 2 using MCS 7-9, but the opposite might equally well be the case, i.e. data stream 2 could be assigned one of MCS 5-9 and data stream 1 could be assigned one of MCS 7-9.

In step 12, the DSS then makes the following decision regarding the swapping:

Granularity level: 2
No swap of q bits (shown in FIG. 9 as the corresponding flag being FALSE)
No swap of training sequence (shown in FIG. 9 as the corresponding flag being FALSE)

In the examples given in FIGS. 8 and 9, the decisions taken in steps 4, 5 and 6 of FIG. 8 and steps 10, 11 and 12 of FIG. 9, are based on an implicit coupling between the swapping of the training sequence and the swapping of the q-bits, as follows: The training sequences are known to the receiver, and are different between the data streams, which enables the receiver to identify and couple training sequence 1 with data stream 1 and training sequence 2 with data stream 2. Since the q bits are adjacent to the training sequence, after demodulation of the four bursts, the receiver knows the q-bits associated with each data stream, which enables the receiver to know that, for example, data stream 1 uses MCS5 or MCS6 and that data stream 2 uses MCS7, MCS8 or MCS 9. With reference to FIGS. 5 and 6, the receiver then knows that granularity level 2 was used and can proceed to de-swap the data streams.

In summary, in the examples of FIGS. 8 and 9, the decision to swap the training sequence "triggers" the swap of the q-bits. In other embodiments, it is possible to decide to do the opposite, that is, to not swap the q-bits when the training sequence is swapped, which would also work (although this has to be known at the receiver side), but in this case as well, swapping of the q-bits is coupled to the decision to swap or not swap the training sequence.

The swapping of the training sequence may depend on entirely other reasons, for example it may be decided not to swap the training sequences if pre-coding or beam forming are used by the transmitter, and to swap the training sequences if precoding or beam forming is not used by the transmitter.

Turning now to the receiver side, a receiver must be arranged to blindly detect the granularity level of the swapping, and to de-swap the data streams prior to decoding. The term "de-swap" is here used to denote the opposite of swapping, i.e. de-swapping entails restoring the data streams so that swapped parts of the data streams are placed in the proper place in their proper (or original) data streams. However, a receiver must also receive an indication of whether or not the training sequences have been swapped. Some alternative or complementary methods for how this indication can be conveyed to a receiver will be shown below.

The transmitter needs to indicate to the receiver whether or not layer swapping is used, and whether the training sequence is layer swapped or not. Some alternatives for signaling of the use of layer swapping are outlined:

Explicit Signaling in System Info (SI):

An information element (IE) could be introduced in system information message transmitted in the EGPRS cell on the broadcast channel (BCCH). The information element would then contain one or more bits indicating the use of layer swapping, and some characteristics of the layer swapping schemes, such as whether training sequences are layer swapped, which granularity levels that are supported, and/or the different MCS's for which data stream swapping is applicable. The IE would apply to all MSs in the cell capable of MIMO mode, i.e. MIMO transmission and/or reception.

Dedicated Signaling

Dedicated signaling can be utilized, with an information element in a signaling message being used to convey the use of layer swapping and/or whether training sequences are layer swapped, as well as indicating granularity levels and/or or the different MCS's for which data stream swapping is applicable. The dedicated signaling can e.g. be transmitted on the PACCH, using a dedicated radio block on the DL. Signaling to the MSs can also be performed during call setup/TBF (Temporary Block Flow) establishment.

Dedicated in-Band Signaling

To minimize signaling overhead, the dedicated signaling information can be conveyed by re-defining the header fields in the current header definitions in 3GPP TS44.060. For EGPRS2, there are also spare bits available in the header field of the RLC data blocks conveyed by the bursts that can be used to indicate the use of data stream swapping or training sequence swap between data streams, or switching between non-swapped and swapped transmission.

Implicit Signaling by Symbol Rotation

In GSM/EDGE today, different rotations are used to distinguish between different modulations in EGPRS/EGPRS2. The use of symbol rotation can be extended to use additional rotations to indicate whether or not layer swapping is used, or alternatively whether the training sequences are layer swapped. This allows the receiver to blindly detect whether layer swapping has been used at the transmitter, or whether the training sequences are layer swapped.

Implicit Signaling by New TSC Definitions

In GSM/EDGE today there are eight different Training Sequence Codes, TSCs, defined for packet switched services (and eight additional TSCs defined for circuit switched services by the VAMOS feature). Different TSCs need to be used for the different layers in MIMO, in order for the receiver to separate the layers transmitted. Furthermore, an additional set of orthogonal TSCs can be defined to signal whether or not layer swapping is used or whether the training sequences are layer swapped. This approach is similar to implicit signaling by symbol rotation since a rotated TSC could also be seen as a "new" TSC.

Regarding the swapping that can take place between the data streams, a number of alternative or complementary possibilities can be discerned:

Swapping of training sequences,
Swapping of payload
Swapping of q-bits

It should be pointed out that any and all combinations of the swaps identified above can occur.

Figure 10:
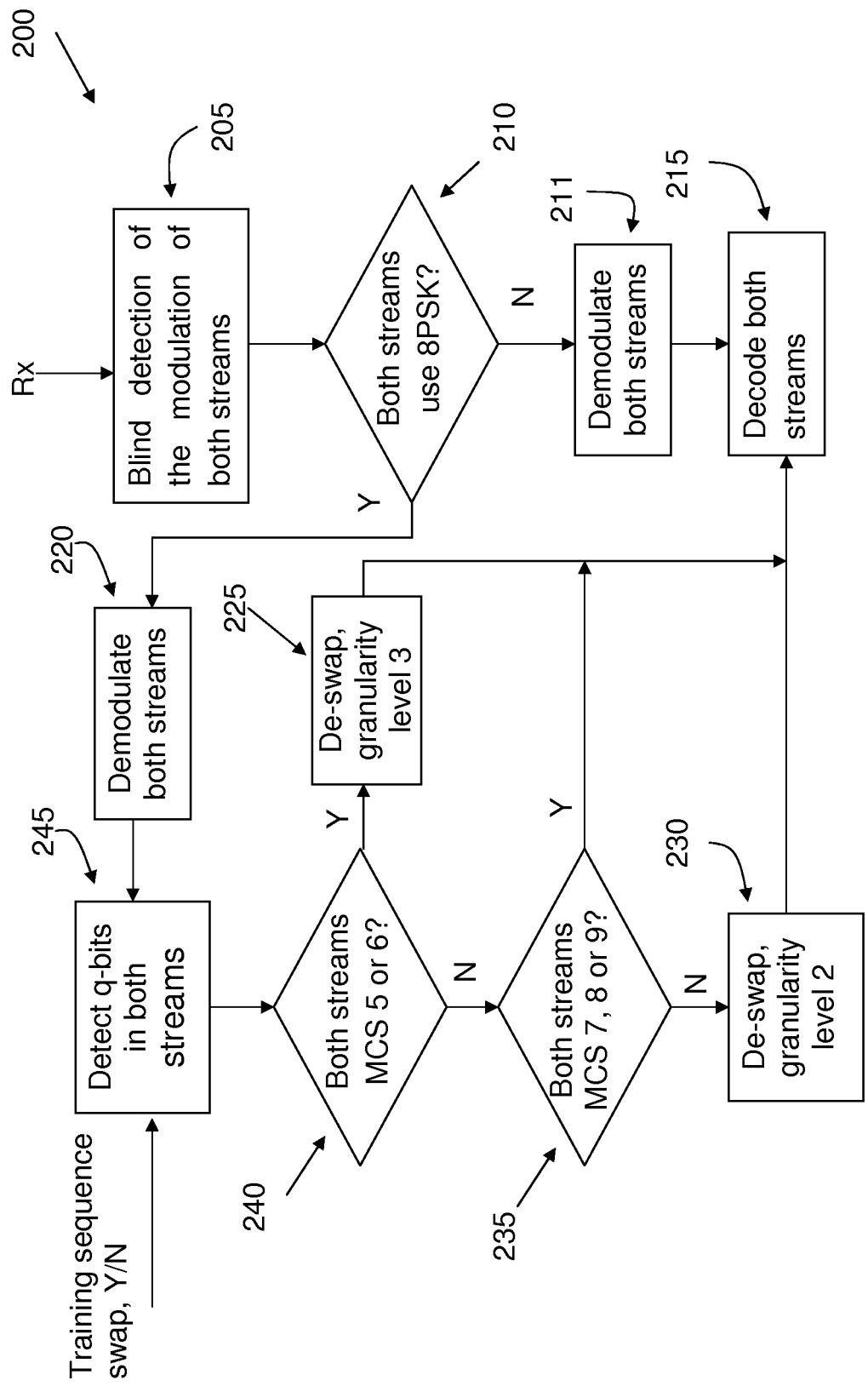
FIG. 10 shows a flow chart for an EGPRS MIMO receiver.

FIG. 10 shows a flow chart of a method 200 for use in a receiver in an EGPRS MIMO system when two data streams which may have been subjected to "swapping" are received. Naturally, the method 200 of FIG. 10 can be generalized to use for more than two data streams. It is assumed that if swapping has taken place at all, the swapping principles of FIG. 8 or 9 have been used, as well as the granularity principles of FIGS. 5 and 6.

In addition, in the example of a method for use in a receiver given in FIG. 10 is restricted to the case of EGPRS as such, i.e. not EGPRS2 or other derivatives of EGPRS. In EGPRS, there are two modulations used, 8PSK and GMSK, Gaussian Minimum Shift Keying. GMSK is used for MCSs 1-4 and 8PSK is used for MCS 5-9.

In step 205, the receiver performs blind detection of the modulation used for both the received data streams. In step 210, the receiver checks if both data streams use 8PSK, which may be detected by means of the training sequences and the rotation angles, which are known. If the answer to the check in step 210 is no, this means (see above) that at least one stream uses GMSK, in which case granularity level 1 has been used, and there is no need for de-swapping, since in that case entire radio blocks have been swapped at the transmitter, i.e. no swapping is performed within the radio blocks. Thus, if the answer in step 210 is no, both data streams can be demodulated, step 211, and decoded, step 215, directly.

If the answer in step 210 is yes, then both streams are demodulated in step 220, and their respective MCS is partially detected in step 245 using the information given by the q-bits.

Using the information from step 245, in step 240, a check is performed of whether or not both streams use one of MCS 5 or 6. If that is the case, in step 225 de-swap is performed assuming granularity level 3, since that is the level that would have been used according to FIG. 6. Following step 225, decoding of both data streams is performed in step 215.

If the check in step 240 reveals that both data streams do not use the same of MCS 5 or 6, a check is performed in step 235 of whether or not both of the received data streams use the same MCS, and if the common MCS is one of MSC 7, 8 or 9. If the answer to the check in step 235 is used, this means that granularity level 1 has been used, and no de-swap needs to take place, for the reasons explained above in connection to the "yes-case" of step 210. In this case, decoding of both data streams is then performed in step 215.

If the answer to the check of step 235 is no, then granularity level 2 has been used, and a corresponding de-swap is performed in step 230, following which decoding of both data streams is performed in step 215.

In the steps above in which the MCS is checked, this is done using the q-bits which partially identify the MCS used to the receiver. The modulation type used by the transmitter is implicitly signaled by the transmitter to the receiver by the rotation angle of the training sequence. If GMSK modulation is detected, then MCS1-4 has been used. If 8PSK modulation has been used, then MCS5-9 is used. Assuming that 8PSK modulation is detected, the q-bits indicate whether MCS5-6 or MCS7-9 is used. Hence, steps 210, 240 and 235 do not actually require knowledge of the exact MCS, but only require knowledge of the modulation type (provided by the rotation angle of the training sequence), and the partial information about the MCS provided by the q-bits. In other words, the modulation type together with the q-bits provides enough information to de-swap the data streams.

Figure 11:
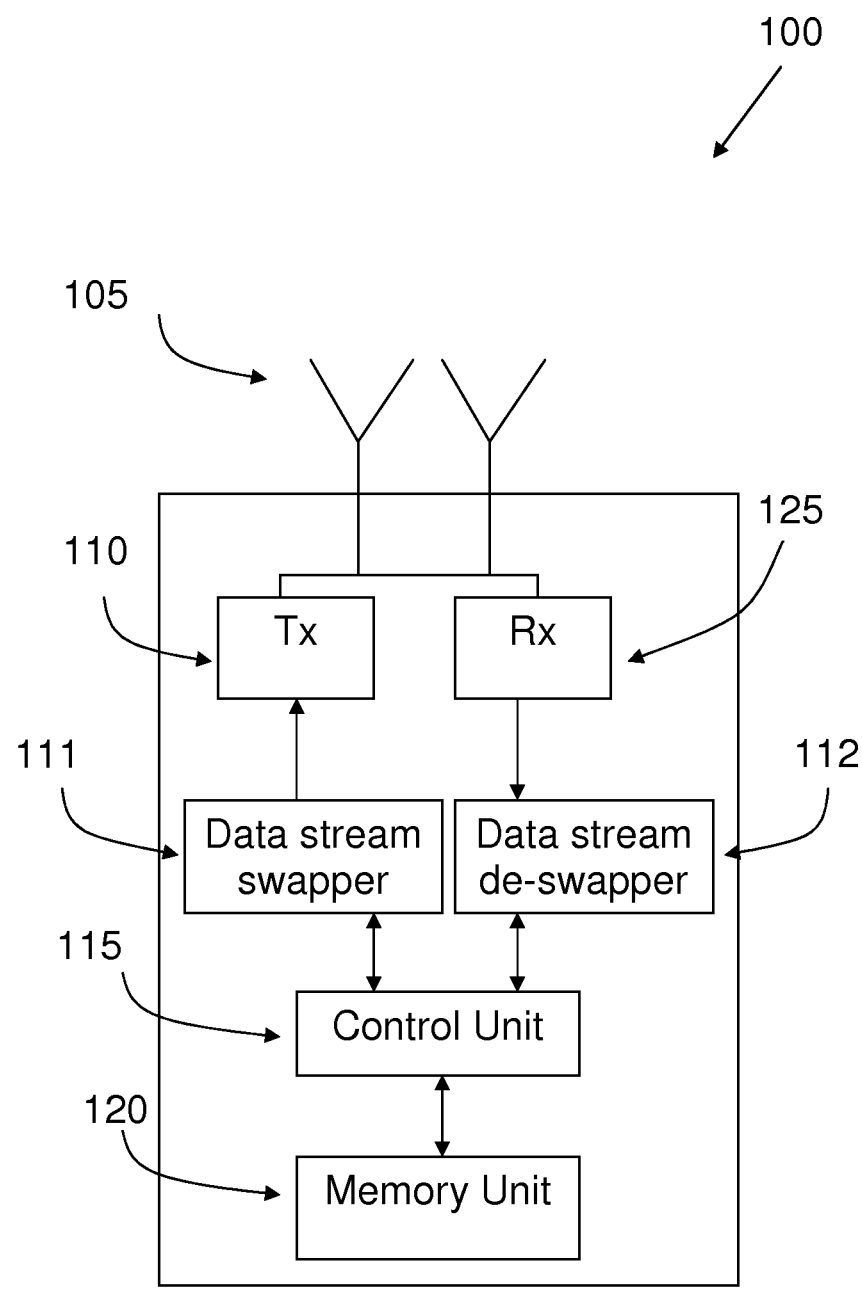
FIG. 11 shows a block diagram of a network node.

FIG. 11 shows a block diagram of a network node 100 for a MIMO enabled EGRS system. In this context, as previously, EGPRS is taken to mean derivates of EGPRS as well, e.g. EGPRS2. The network node 100 can be either a Mobile Terminal or a Radio Base Station in an EGPRS MIMO enabled system.

As shown in FIG. 11, the network node 100 comprises an antenna unit 105, which suitably is used both as a transmit antenna and a receive antenna. The antenna unit comprises at least two antennas which can both serve as transmit and receive antennas simultaneously. The network node also comprises a transmit unit Tx 110, connected to the antenna unit 105. The transmit unit 110 performs modulation, up-conversion to RF frequency and amplification of the signals to be transmitted. In addition, there is also comprised a data stream swapper 111, which performs the swapping between the data streams.

The network node 100 also comprises a receive unit Rx 125, connected to the antenna unit 105. The receive unit 125 performs frequency down-conversion and demodulation. There is also a data stream de-swapper 112 connected to the receive unit 112, which performs de-swapping between the data streams, if needed.

There is also comprised a control unit 115 in the network node 100, which controls the overall function of the network node 100, e.g. the layer swapping and de-swapping. There is also comprised a memory unit 120 in the network node 100, which e.g. comprises the swapping patterns of FIGS. 5 and 6, as well as information on the various MCSs. The control unit 115, possibly with the aid of the receive unit 125, detects if swaps have taken place, and if that is the case, control the unit 112 to perform "de-swapping".

Figure 12:
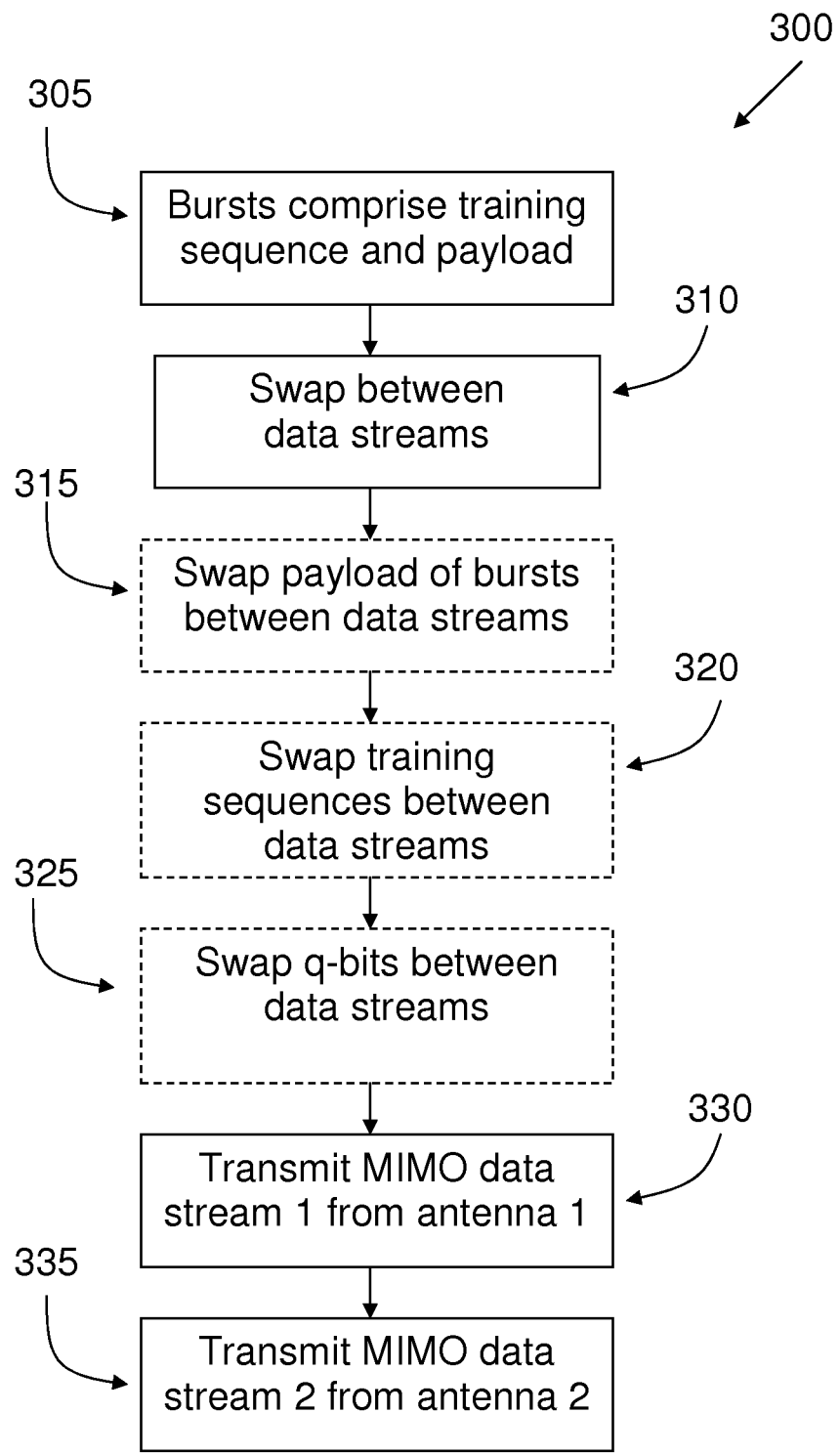
FIGS. 12 and 13 show flow charts of methods for operating an EGPRS MIMO transmitter.

FIG. 12 shows a flow chart 300 of a method for operating a network node in an EGPRS system. Steps which are alternatives or options are indicated by means of boxes with dashed lines.

The method 300 comprises transmitting at least a first and a second data stream as MIMO streams, where, as indicated in step 330, the first data stream is transmitted from a first antenna, and, step 335, the second data stream is transmitted from a second transmit antenna.

As indicated in step 305, bursts are formed from the data streams which comprise training sequence and payload. As indicated in step 310, the method 300 comprises swapping parts of the data streams between the transmit antennas, i.e. transmitting all or parts of one or more bursts belonging to the first data stream from the second transmit antenna and transmitting corresponding all or parts of one or more bursts belonging to the second data stream from the first transmit antenna.

As shown in step 315, in embodiments the method 300 comprises swapping all or parts of the payload of two or more bursts from said data streams between the bursts.

As shown in step 325, in embodiments the method 300 comprises swapping all or parts of the q-bits of two or more bursts from said data streams between the bursts, the q-bits being bits that identify the Modulation and Coding Scheme, MCS, that has been used in a radio block which comprises a number of bursts.

As shown in step 320, in embodiments the method 300 comprises swapping all or parts of the training sequences of two or more bursts from said data streams between the bursts.

In embodiments, the method 300 comprises performing the swaps adaptively in response to the modulation and coding scheme, MCS, used for the bit streams.

In embodiments, the method 300 comprises performing the swaps adaptively in response to the length of the transmission time intervals, TTIs, used, said TTIs being either Basic TTIs or Reduced TTIs.

Figure 13:
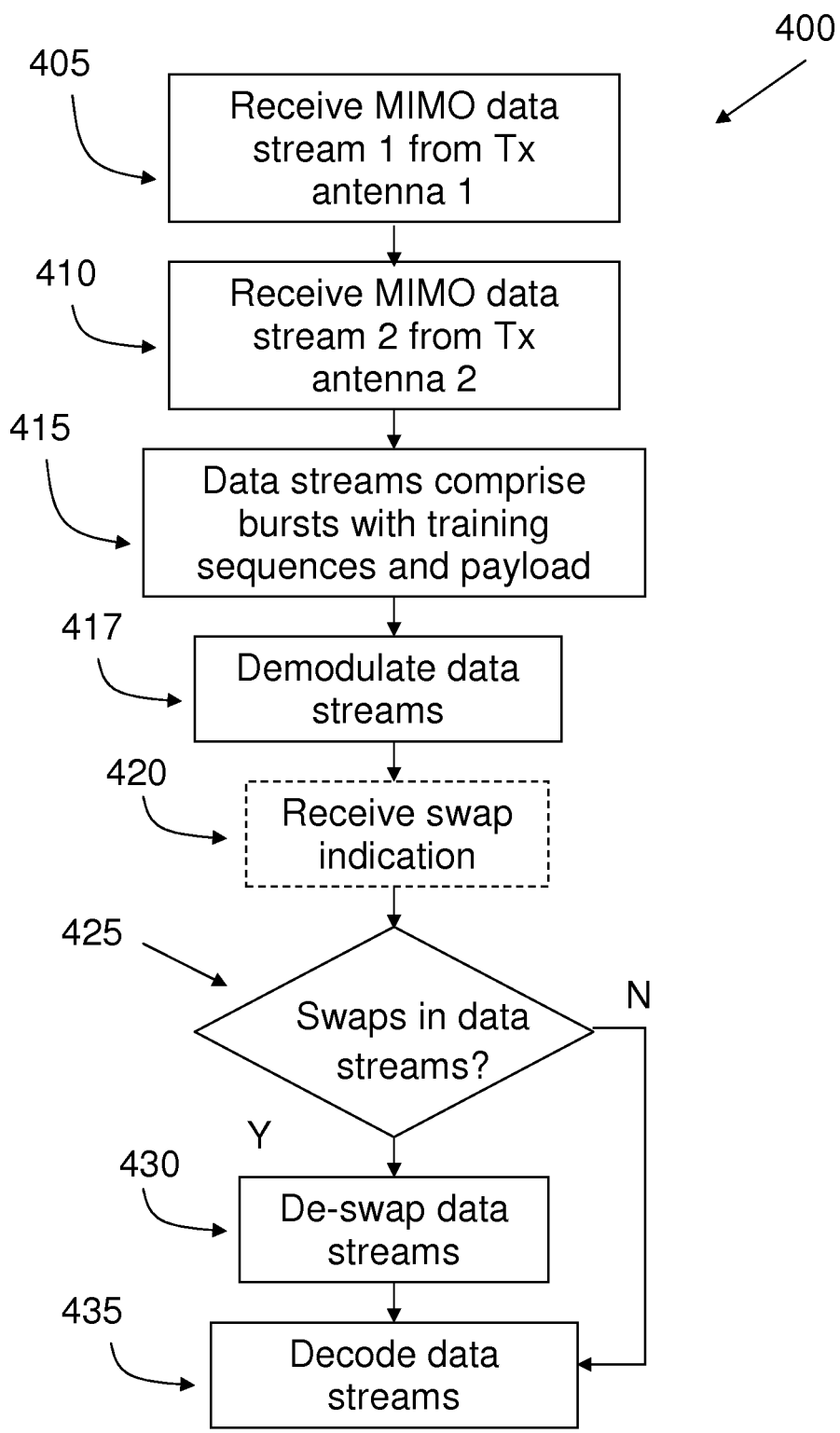

FIG. 13 shows a flow chart of a method 400 for operating a network node in an EGPRS system. Steps which are options or alternatives are shown in boxes with dashed lines.

As shown in step 405 and 410, the method 400 comprises receiving at least a first and a second data stream as MIMO streams from a transmitting node, with the first data stream having been transmitted from a first antenna and the second data stream having been transmitted from a second transmit antenna.

As indicated in step 415, the method 400 comprises receiving the data streams as bursts comprising a training sequence and payload, and as shown in step 417, the data streams are demodulated. As shown in step 425, the method comprises detecting if parts of the data streams have been swapped between the transmit antennas, i.e. if all or parts of one or more bursts belonging to the first data stream have been transmitted from the second transmit antenna and corresponding all or parts of one or more bursts belonging to the second data stream have been transmitted from the first transmit antenna.

If such swaps have taken place, then, in step 430, swapped parts of the data streams are restored to their proper data stream. As shown in step 435, the data streams are decoded, which takes places regardless of whether or not swaps are detected in step 425.

In embodiments, the method 400 comprises receiving, step 420, an indication that parts of said data streams have been swapped between the transmit antennas. In some such embodiments, the method 400 comprises receiving this indication as one or more of:

An information element, SI, in a system information message on a broadcast channel,
An information element, SI, in a dedicated signaling message,
As information in the header of RLC data blocks conveyed by the bursts,
By means of symbol rotation in the bursts,
By means of special training sequences used for swapped data streams.

In embodiments, the method 400 comprises detecting swaps of the payload of two or more bursts between the data streams.

In embodiments, the method 400 comprises detecting swaps of the q-bits of two or more bursts between the data streams.

In embodiments, the method 400 comprises detecting swaps of the training sequences of two or more bursts between the data streams.

Embodiments of the invention have been described with reference to the drawings, such as block diagrams and/or flowcharts. In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A network node for an EGPRS system, the network node being equipped with a plurality of transmit antennas and being arranged to transmit at least a first and a second data stream as MIMO streams, with the first data stream being transmitted from a first transmit antenna and the second data stream being transmitted from a second transmit antenna, the network node being arranged to transmit said data streams as bursts comprising a training sequence and payload, the network node being characterized in that it is arranged to swap parts of said data streams between the transmit antennas, i.e. to transmit all or parts of one or more bursts belonging to the first data stream from the second transmit antenna and to transmit corresponding all or parts of one or more bursts belonging to the second data stream from the first transmit antenna, the network node being arranged to perform said swaps adaptively based on one or more of a modulation and coding scheme, MCS, and a length of transmission time intervals, TTIs, used for the bursts.

2. The network node of claim 1, being arranged to swap all or parts of the payload of two or more bursts from said data streams between the bursts.

3. The network node of claim 1, being arranged to swap all or parts of q-bits of two or more bursts from said data streams between the bursts, the q-bits being bits that partially identify the Modulation and Coding Scheme, MCS, that has been used in a radio block which comprises a number of bursts.

4. The network node of claim 1, being arranged to swap all or parts of the training sequences of two or more bursts from said data streams between the bursts.

5. The network node of claim 1, wherein said TTIs being either Basic TTIs or Reduced TTIs.

6. A network node for an EGPRS system, the network node being equipped with a plurality of receive antennas and being arranged to receive at least a first and a second data stream as MIMO streams from a transmitting node, with the first data stream having been transmitted from a first transmit antenna and the second data stream having been transmitted from a second transmit antenna, the network node being arranged to receive said data streams as bursts comprising a training sequence and payload, the network node being characterized in that it is arranged to detect if parts of said data streams have been swapped between the transmit antennas, i.e. if all or parts of one or more bursts belonging to the first data stream have been transmitted from the second transmit antenna and corresponding all or parts of one or more bursts belonging to the second data stream have been transmitted from the first transmit antenna, and if such swaps have taken place, to restore swapped parts of the data streams to their proper data stream, and to then demodulate and decode said data streams regardless of whether or not swaps have taken place between the data streams, the network node being arranged to detect said swaps, said swaps being performed adaptively based on one or more of a modulation and coding scheme, MCS, and a length of transmission time intervals, TTIs, used for the bursts.

7. The network node of claim 6, being arranged to receive an indication that parts of said data streams have been swapped between the transmit antennas.

8. The network node of claim 7, being arranged to receive said indication as one or more of:
   An information element, SI, in a system information message on a broadcast channel,
   An information element, SI, in a dedicated signaling message,
   As information in the header of RLC data blocks conveyed by the bursts,
   By means of symbol rotation in the bursts, and
   By means of special training sequences used for swapped data streams.

9. The network node of claim 7, being arranged to detect swaps of the payload of two or more bursts between said data streams.

10. The network node of claim 7, being arranged to detect swaps of q-bits of two or more bursts between said data streams, the q-bits being bits that partially identify the Modulation and Coding Scheme, MCS, that has been used in a radio block which comprises a number of bursts.

11. The network node of claim 7, being arranged to detect swaps of the training sequences of two or more bursts between said data streams.

12. A method for operating a network node in an EGPRS system, the method comprising transmitting at least a first and a second data stream as MIMO streams where the first data stream is transmitted from a first transmit antenna and the second data stream is transmitted from a second transmit antenna, the method further comprising transmitting said data streams as bursts comprising a training sequence and payload, the method being characterized in that it comprises swapping parts of said data streams between the transmit antennas, i.e. transmitting all or parts of one or more bursts belonging to the first data stream from the second transmit antenna and transmitting corresponding all or parts of one or more bursts belonging to the second data stream from the first transmit antenna, the swapping being performed adaptively based on one or more of a modulation and coding scheme, MCS, and a length of transmission time intervals, TTIs, used for the bursts.

13. The method of claim 12, comprising swapping all or parts of the payload of two or more bursts from said data streams between the bursts.

14. The method of claim 12, comprising swapping all or parts of q-bits of two or more bursts from said data streams between the bursts, the q-bits being bits that partially identify the Modulation and Coding Scheme, MCS, that has been used in a radio block which comprises a number of bursts.

15. The method of claim 12, comprising swapping all or parts of the training sequences of two or more bursts from said data streams between the bursts.

16. The method of claim 12, wherein said TTIs being either Basic TTIs or Reduced TTIs.

17. A method for operating a network node in an EGPRS system, the method comprising receiving at least a first and a second data stream as MIMO streams from a transmitting node, with the first data stream having been transmitted from a first transmit antenna and the second data stream having been transmitted from a second transmit antenna, the method comprising receiving said data streams as bursts comprising a training sequence and payload, the method being characterized in that it comprises detecting if parts of said data streams have been swapped between the transmit antennas, i.e. if all or parts of one or more bursts belonging to the first data stream have been transmitted from the second transmit antenna and corresponding all or parts of one or more bursts belonging to the second data stream have been transmitted from the first transmit antenna, and if such swaps have taken place, restoring swapped parts of the data streams to their proper data stream, and demodulating and decoding said data streams regardless of whether or not swaps have taken place between the data streams, the swaps being performed adaptively based on one or more of a modulation and coding scheme, MCS, and a length of transmission time intervals, TTIs, used for the bursts.

18. The method of claim 17, comprising receiving an indication that parts of said data streams have been swapped between the transmit antennas.

19. The method of claim 18, comprising receiving said indication as one or more of:

An information element, SI, in a system information message on a broadcast channel, An information element, SI, in a dedicated signaling message, As information in the header of RLC data blocks conveyed by the bursts, By means of symbol rotation in the bursts, By means of special training sequences used for swapped data streams.

20. The method of claim 17, comprising detecting swaps of the payload of two or more bursts between said data streams.

21. The method of claim 17, comprising detecting swaps of q-bits of two or more bursts between said data streams, the q-bits being bits that partially identify the Modulation and Coding Scheme, MCS, that has been used in a radio block which comprises a number of bursts.

22. The method of claim 17, comprising detecting swaps of the training sequences of two or more bursts between said data streams.

* * * * *